United States Patent
Fringeli

[11] 3,895,009
[45] July 15, 1975

[54] STILBENE COMPOUNDS
[75] Inventor: Werner Fringeli, Basel, Switzerland
[73] Assignee: Ciba-Geigy AG, Basel, Switzerland
[22] Filed: Dec. 18, 1972
[21] Appl. No.: 316,154

[30] Foreign Application Priority Data
Dec. 27, 1971 Switzerland.................. 18965/71

[52] U.S. Cl..... 260/240.1; 117/33.5 R; 117/33.5 T; 252/301.2 W; 252/543; 260/240 B
[51] Int. Cl............................................ C09b 23/00
[58] Field of Search................... 260/240 B, 240.1

[56] References Cited
UNITED STATES PATENTS
2,945,762  7/1960  Carroll et al.............. 260/240 B
3,177,207  4/1965  Siegel et al................ 260/240 B
3,392,122  7/1966  Obayashi et al............ 260/240 B X
3,558,611  1/1971  Fleck........................ 260/240.1 X FOREIGN PATENTS OR APPLICATIONS
870,263  3/1953  Germany.................. 260/240 B Primary Examiner—John D. Randolph
Attorney, Agent, or Firm—Joseph G. Kolodny; Edward McC. Roberts; Prabodh I. Almaula

[57] ABSTRACT
New stilbene compounds of the formula

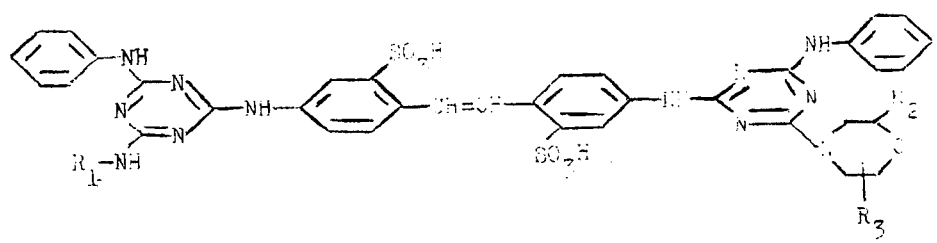

wherein
$R_1$ represents alkyl with 1 to 4 carbon atoms
$R_2$ and $R_3$ independently of one another represents hydrogen or methyl and
M represents hydrogen, an alkali metal or an optionally substituted ammonium cation.

These compounds are useful as optical brighteners.

4 Claims, No Drawings

STILBENE COMPOUNDS

The present invention relates to new derivatives of 4,4'-bis-triazinylamino-stilbene-2,2'-disulphonic acid, processes for their manufacture, their use for the optical brightening of organic materials, especially cotton, and washing agents containing these compounds. Both symmetrically and asymmetrically substituted derivatives of 4,4'-bis-triazinylamino-stilbene-2,2'-disulphonic acid which can be used as optical brighteners are already known in large numbers, for example from German Pat. Specification Nos. 870,263 and 1,183,882.

As compared to structurally comparable previously known 4,4'-bis-triazinylamino-stilbene-2,2'-disulphonic acids, the compounds according to the invention defined below are above all distinguished by very good absorption, especially on cotton, over the entire temperature range over which the washing agents are employed.

The compounds according to the invention are asymmetrical substitution products of 4,4'-bis-triazinylamino-stilbene-2,2'-disulphonic acid and correspond to the formula or methyl and M denotes a hydrogen, alkali metal or optionally substituted ammonium cation. With the scope of the formula (1), the compounds of the formula (2)

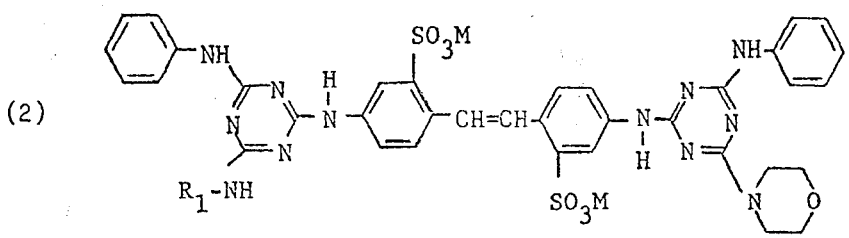

(2)

wherein $R_1$ denotes alkyl with 1 to 4 carbon atoms and M denotes a hydrogen, alkali metal or optionally substituted ammonium cation, should be singled out.

The preferred compound is 4-(2-anilino-4-morpholino-1,3,5-triazinyl-(6)-amino)-4'-(2-anilino-4-ethylamino-1,3,5-triazinyl-(6)-amino)-stilbene-2,2'-disulphonic acid in the form of the sodium salt. Further, 4-(2-anilino-4-morpholino-1,3,5-triazinyl-(6)-amino)-4'-(2-anilino-4-isopropylamino-1,3,5-triazinyl-(6)-amino)-stilbene-2,2'-disulphonic acid and its sodium salt are also of particular interest. The compounds of the formula (1) can be manufactured analogously to known processes.

Advantageously, 4-nitro-4'-amino-stilbene-2,2'-disulphonic acid or a salt thereof is condensed in a known manner with cyanuric chloride to give 4-nitro-4'-(2,4-dichloro-1,3,5-triazinyl-(6)-amino)-stilbene-2,2'-disulphonic acid, whereupon the latter is reacted, in each case in optional sequence, with (1a) aniline and (1b) optionally methyl-substituted morpholine or 2a)

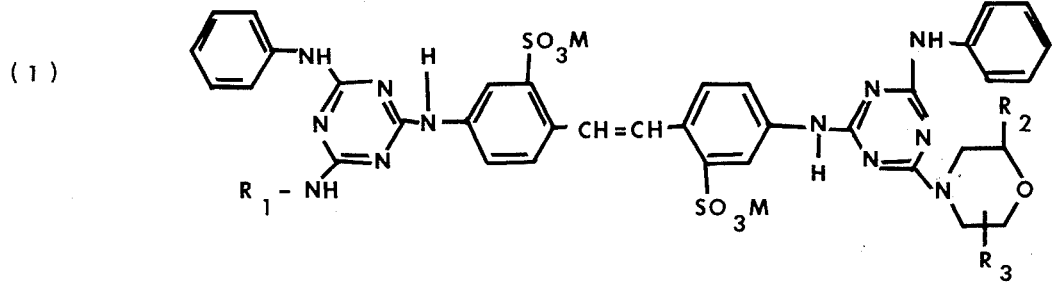

(1)

wherein $R_1$ denotes alkyl with 1 to 4 carbon atoms, $R_2$ and $R_3$ independently of one another denote hydrogen aniline and 2b) an alkylamine with 1 to 4 carbon atoms, to give a compound of the formula

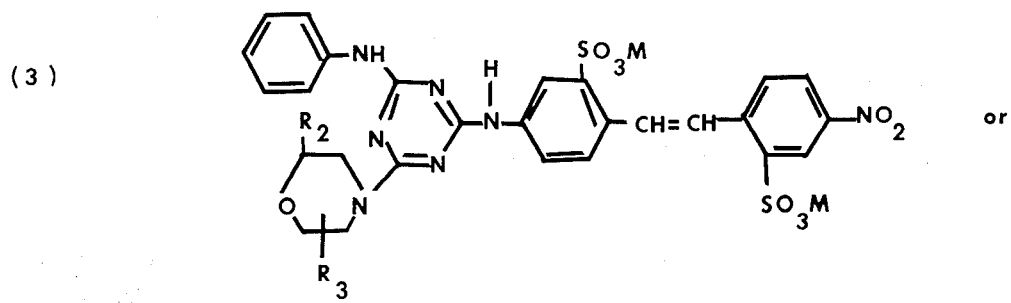

(3) or (4) 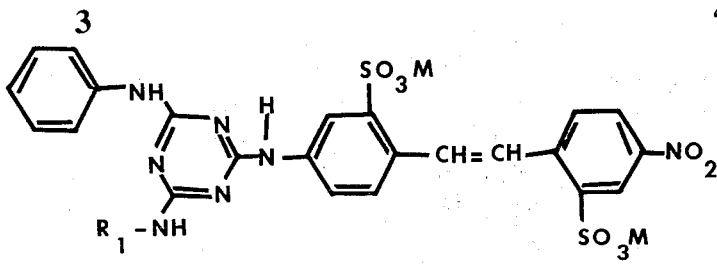

wherein $R_1$, $R_2$, $R_3$ and M have the abovementioned meaning.

Thereafter, the nitro group of a condensation product thus obtained is converted by reduction, for example with iron in the presence of an acid, into the amino group and the latter is again converted into a derivative, in an analogous manner to that described above for the other amino group, so as to produce a compound of the formula (1). For this purpose, the amino compound resulting from the nitro compound of the formula (3) is reacted in optional sequence with aniline and an alkylamine with 1 to 4 carbon atoms, or the compound manufactured from the nitro compound of the formula (4) is reacted in optional sequence with aniline and with optionally methylsubstituted morpholine.

The manufacture of compounds of the formula (1) is furthermore also possible, for example, starting from 4,4'-diamino-stilbene-2,2'-disulphonic acid or its salts, by reacting the latter firstly with 2 mols of cyanuric chloride, after which the condensation product obtained is reacted with 2 mols of aniline and the resulting reaction product is condensed, in a third stage, with an excess of a mixture of optionally methyl-substituted morpholine and alkylamine with 1 to 4 carbon atoms, the composition of the mixture being in accordance with the reaction velocities of the individual components.

The new stilbene compounds of the formula (1) are appropriately isolated from the reaction mixture as metal salts. They are suitable for use as optical brighteners for washing agents. Suitable washing agents for example contain, as detergent substances, anionic compounds such as alkali metal salts, especially sodium salts, of higher fatty acids, alkylarylsulphonates, above all dodecylbenzenesulphonate or tetrapropylbenzenesulphonate, secondary alkyl sulphates with a higher secondary alkyl radical, fatty alcohol sulphates, such as dodecyl sulphate, or sulphated addition products of 2 to 3 mols of ethylene oxide to dodecyl alcohol, or nonionic compounds, such as fatty alcohol polyglycol ethers or higher alkylphenol polyglycol ethers. In addition, these washing agents can contain fillers and auxiliaries which are customary in the textile finishing industry, for example alkali metal polyphosphate and polymetaphosphate, alkali metal pyrophosphate, alkali metal silicates, alkali metal carbonates, alkali metal borates, alkali metal perborates, alkali metal salts of carboxymethylcellulose, foam stabilisers, such as hydroxyalkylamides of higher fatty acids or complexones, such as soluble salts of ethylenediaminetetraacetic acid. Furthermore the washing agents can contain for example, antistatic agents, skin protection agents which are non-greasy, such as lanolin, enzymes, antimicrobial agents, perfumes and other optical brighteners.

The content of brighteners of the formula (1) or (2), according to the invention, in the liquid or pulverulent final washing agent can be 0.001 to 2% by weight, preferably 0.005 to 0.5% (relative to the washing agent).

The new stilbene compounds of the formula (1) are absorbed from aqueous solution, especially from aqueous solution containing washing agents of the abovementioned type, onto cellulose material, such as cotton, and on polyamides, over the entire temperature range which may be used for washing (for example 25°–92°C). The content of whiteners of the formula (1) in aqueous textile treatment solutions is advantageously 0.001 to 0.2% (relative to the weight of the material to be brightened). The material treated with liquors containing brighteners of the formula (1) acquires a pure white appearance with a blue-violet shade. The whiteners according to the invention impart to the textile material, when it is repeatedly washed, a good increase in the degree of whiteness without undesired discolouration.

In the examples which follow the parts are always parts by weight and the percentages are always percentages by weight.

EXAMPLE 1

A solution of 18.4 parts of cyanuric chloride in 100 parts of acetone is poured into 200 parts of a mixture consisting of equal parts of ice and water and a solution, neutralised with sodium hydroxide, of 40 parts of 4-nitro-4'-amino-stilbene-2,2'-disulphonic acid in 400 parts of water is added dropwise over the course of one hour to the resulting suspension at 0°–5°C whilst stirring and simultaneously keeping the pH value of the reaction mixture at between 6 and 7 by adding a 15% strength sodium carbonate solution. The mixture is stirred for a further half hour and 9.3 parts of aniline are then added, the temperature is raised to 35°C over the course of about half an hour and the mixture is stirred for a further hour at this temperature. At the same time, the resulting hydrochloric acid is neutralised by gradual addition of a 15% strength sodium carbonate solution (pH value between 7 and 8). Thereafter, 10 parts of morpholine are added to the reaction mixture, the temperature is raised to 80°C and the mixture is stirred for about three hours at this temperature whilst simultaneously maintaining a pH value of between 9 and 10 by dropwise addition of a 15% strength sodium hydroxide solution. The condensation product of the formula (5) 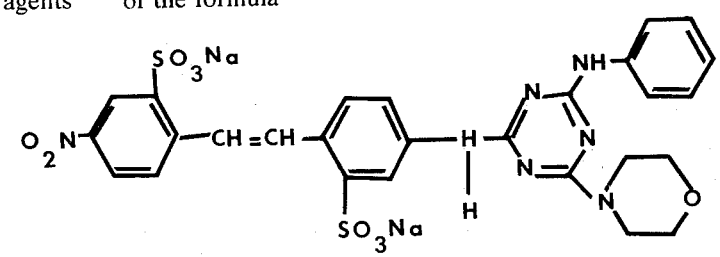

which has separated out after cooling to room temperature is filtered off and washed with a sodium chloride solution. The product dissolved in 400 parts of water is now added dropwise over the course of 1 hour at 90°–100°C, to a reducing solution consisting of 200 parts of water, 30 parts of iron filings and 3 parts of glacial acetic acid. As soon as the nitro compound can no longer be detected, the solution is rendered alkaline with sodium carbonate and filtered and the disodium salt of the 4-amino-4'-(2-anilino-4-morpholino-1,3,5-triazinyl-(6)-amino)-stilbene-2,2'-disulphonic acid produced is separated out from the filtrate by adding sodium chloride, filtered off, washed with sodium chloride solution and dried.

67 parts of the product obtained in this manner are dissolved in 800 parts of water and the resulting solution is added dropwise over the course of 1 hour at 0°–5°C to a suspension which has been obtained by mixing 18.4 parts of cyanuric chloride, dissolved in 100 parts of acetone, with 100 parts of ice and 100 parts of water. In order to neutralise the hydrochloric acid produced, the pH value of the reaction mixture is at the same time kept at between 6 and 7 by dropwise addition of a 15% strength sodium carbonate solution.

Thereafter, the reaction mixture is stirred for half an hour. 9.3 parts of aniline are then added, the temperature is raised to 35°C over the course of about half an hour and the mixture is stirred for a further two hours at this temperature. The resulting hydrochloric acid is neutralised by gradual addition of a 15% strength sodium carbonate solution (pH value between 7 and 8). 11.3 parts of 50% strength aqueous monoethylamine solution are now added to the reaction mixture, the temperature is raised to 80°C and the mixture is stirred for three hours at this temperature whilst at the same time maintaining a pH value of between 9 and 10 by adding a 15% strength sodium hydroxide solution.

The mixture is now allowed to cool slowly to room temperature and the condensation product which has precipitated is filtered off, washed with sodium chloride solution and dried. The disodium salt of 4-(2-anilino-4-morpholino-1,3,5-triazinyl-(6)-amino)-4'-(2-anilino-4-ethylamino-1,3,5-triazinyl-(6)-amino)-stilbene-2,2'-disulphonic acid thus obtained, of the formula

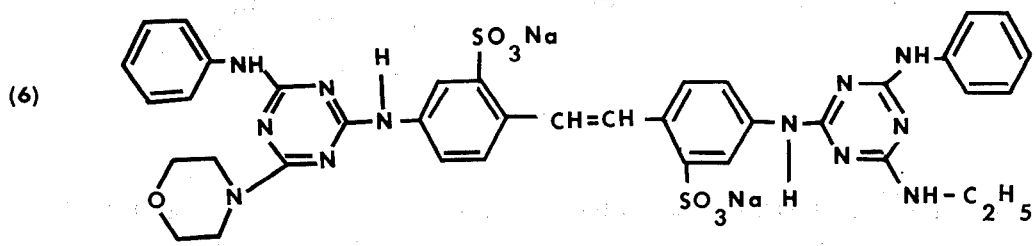

is a pale yellowish, water-soluble powder which can be used as a brightener in washing powders.

EXAMPLE 2

If, instead of 11.3 parts of 50% strength aqueous monoethylamine solution, 8 parts of 50% strength aqueous monomethylamine solution, 7.5 parts of n-propylamine, 7.5 parts of iso-propylamine or 9.5 parts of n-butylamine are employed and in other respects the procedure described in Example 1 is followed, the compounds of the formulae

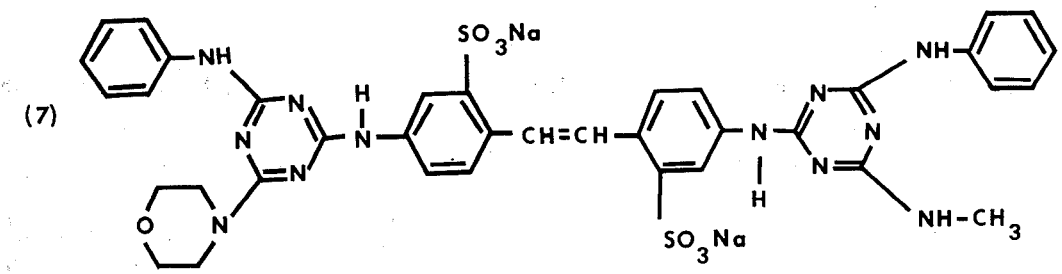

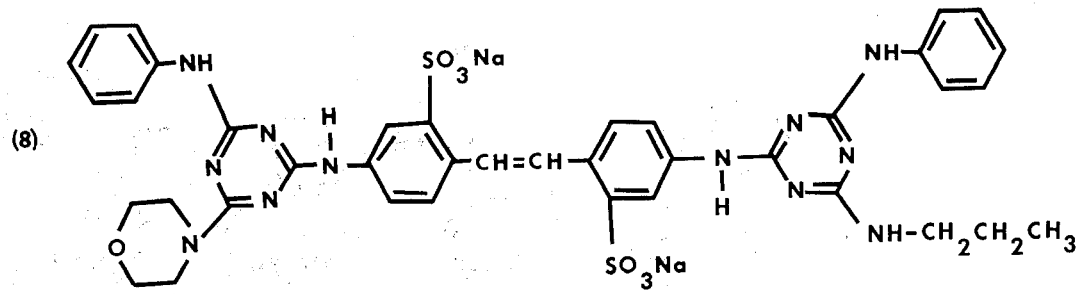

(9) 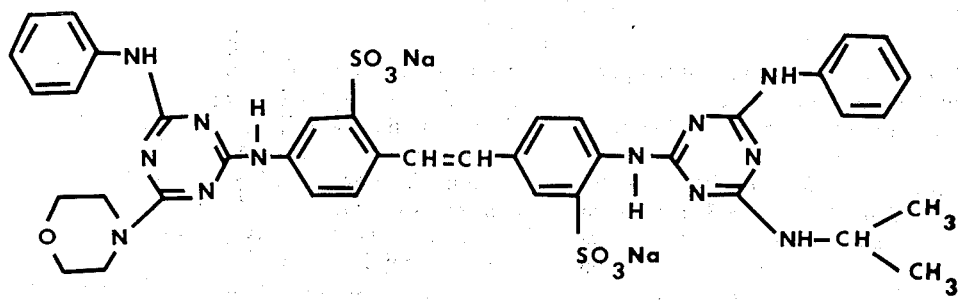 or

(10) 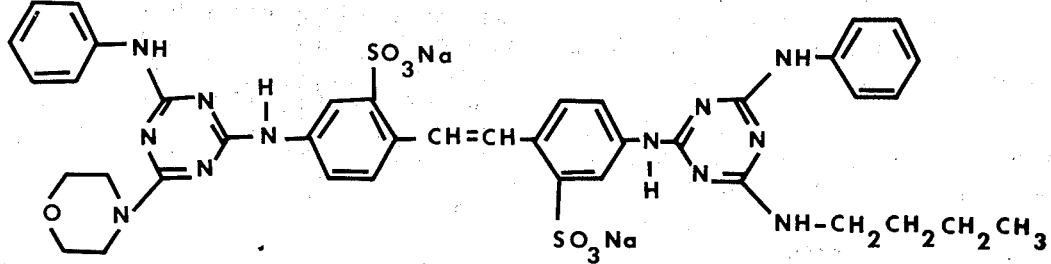

are obtained as pale yellowish, water-soluble powders.

EXAMPLE 3

If, instead of 10 parts of morpholine, 13.2 parts of 2,6-dimethylmorpholine are employed, and in other respects the procedure described in Example 1 is followed, the compound of the formula

(11) 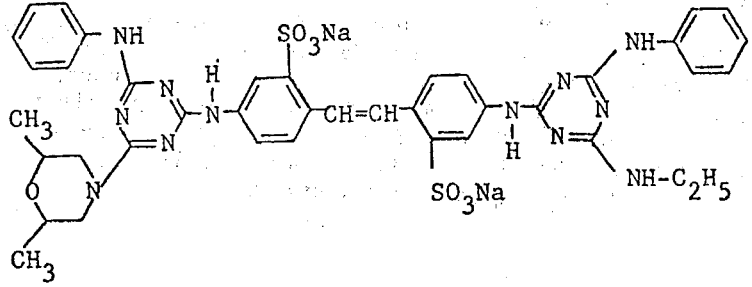

is obtained as a pale yellowish, water-soluble powder.

EXAMPLE 4

If, instead of 10 parts of morpholine, 13.2 parts of 2,6-dimethylmorpholine are employed, and instead of 11.3 parts of 50% strength aqueous ethylamine solution, 8 parts of 50% strength aqueous methylamine solution, 8 parts of n-propylamine, 8 parts of isopropylamine or 10 parts of n-butylamine are employed, and in other respects the procedure described in Example 1 is followed, the compounds of the formulae

(12) 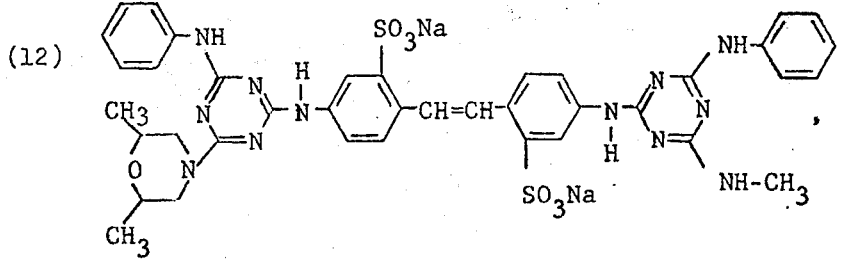

(13) 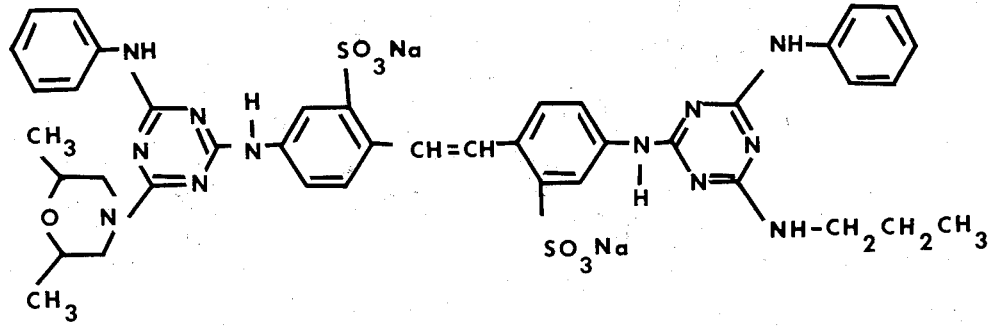

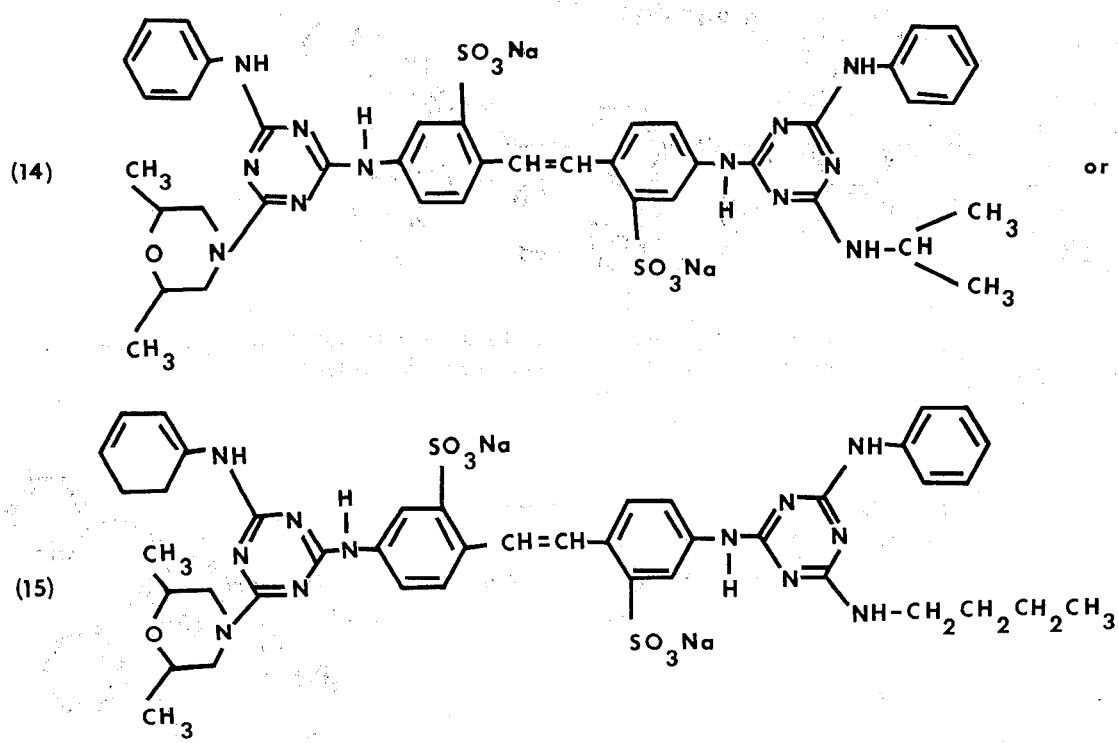

are obtained as pale yellowish, water-soluble powders.

EXAMPLE 5

A mixture of 356 parts of a 50.7% strength ethylamine solution and 36 parts of morpholine in 50 parts of acetone is added at 35°–40°C, whilst stirring, to a suspension of 367.2 parts of the disodium salt of 4,4'-bis-(2-anilino-4-chloro-1,3,5-triazinyl-(6)-amino)-stilbene-2,2'-disulphonic acid (manufactured by condensation of 2 mols of cyanuric chloride with 1 mol of 4,4'-diaminostilbene-2,2'-disulphonic acid and 2 mols of aniline) in 3,000 parts of softened water. Thereafter the temperature of the reaction mixture is raised to 85°–90°C over the course of two hours whilst at the same time keeping the pH value of the reaction mixture, which now slowly dissolves, at 10.5 by addition of a 15% strength sodium hydroxide solution, and the mixture is stirred for three hours at 90°C whilst maintaining a pH value of 10.5. Thereafter the excess ethylamine is distilled off and the reaction mixture is slowly cooled to room temperature. The product of the formula (6) which has separated out is filtered off, washed with sodium chloride solution and dried. 360 parts of a yellow, water-soluble powder are obtained.

EXAMPLE 6

0.1 to 0.2 g of a brightener of the formulae (6) to (15) is in each case dissolved in 2.5 ml of 1 N sodium hydroxide solution and 100 ml of water and converted into a homogeneous paste with 100 g of a heavy duty washing agent consisting of 15.7 parts of sodium dodecylbenzenesulphonate, 3.7 parts of fatty alcohol sulphonate, 2.7 parts of coconutacid monoethanolamide, 39.0 parts of sodium tripolyphosphate, 4.0 parts of sodium silicate, 2.0 parts of magnesium silicate 1.0 part of carboxymethylcellulose, 0.5 part of the tetrasodium salt of ethylenediaminetetraacetic acid, 24.7 parts of sodium sulphate and 6.7 parts of water; thereafter the paste is sprayed in a spray drier. Washing agents of a high degree of whiteness are obtained. Bleached cotton fabrics are washed for 15 minutes at 25° to 92°C in a washing liquor which in each case contains 4 g/litre of a washing agent, containing brightener, described above, using a liquor ratio of 1:20, and are rinsed and dried. Very attractively brightened fabrics are obtained.

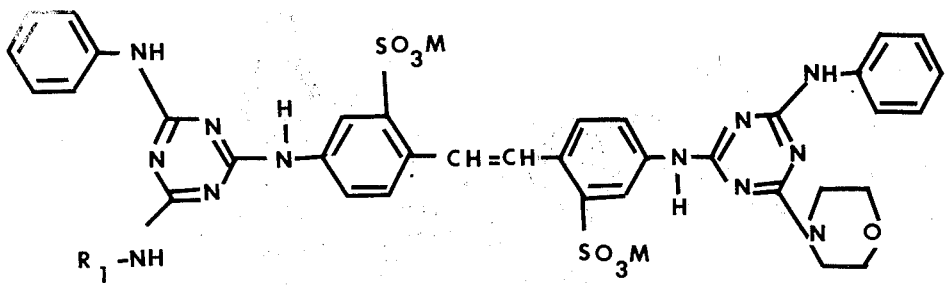
wherein R₁ denotes alkyl with 1 to 4 carbon atoms and M denotes a hydrogen, alkali metal or optionally substituted ammonium cation.
4. The stilbene derivative according to claim 1, corresponding to the formula
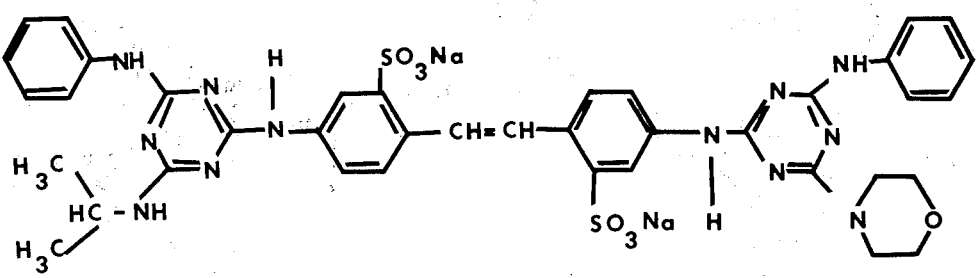
3. The stilbene derivative according to claim 1, corresponding to the formula
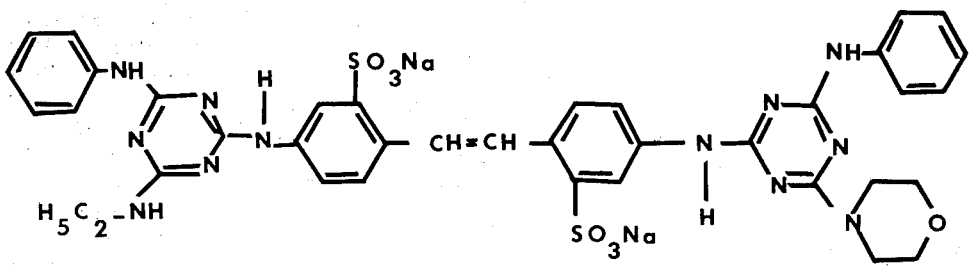

What we claim is:

1. Stilbene derivatives of the formula

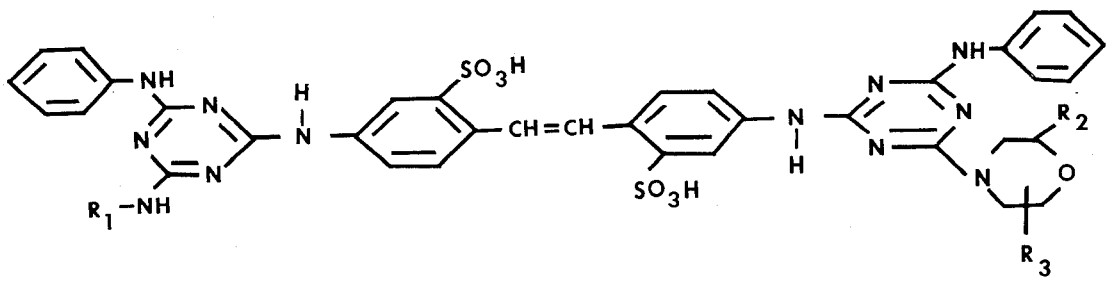

wherein $R_1$ denotes alkyl with 1 to 4 carbon atoms, $R_2$ and $R_3$ independently of one another denote hydrogen or methyl and M denotes a hydrogen, alkali metal or optionally substituted ammonium cation.

2. Stilbene derivatives according to claim 1, corresponding to the formula